United States Patent [19]

Schneider et al.

[11] Patent Number: 4,853,455

[45] Date of Patent: Aug. 1, 1989

[54] SELECTED PHOSPHORIC ACID ESTERS AS HARDENERS FOR EPOXY RESINS

[75] Inventors: Wolfgang Schneider, Kaiseraugst; Kurt Amsler, Basel, both of Switzerland

[73] Assignee: Ciba-Geigy Corporation, Ardsley, N.Y.

[21] Appl. No.: 191,088

[22] Filed: May 6, 1988

[30] Foreign Application Priority Data

May 14, 1987 [CH] Switzerland ............ 1859/87

[51] Int. Cl.$^4$ ................ C08G 59/40
[52] U.S. Cl. .................. 528/108; 528/398; 528/400; 558/160; 558/162; 558/165
[58] Field of Search ............. 528/108, 400, 89, 398; 558/160, 162, 165

[56] References Cited

U.S. PATENT DOCUMENTS

| | | | |
|---|---|---|---|
| 2,541,027 | 2/1951 | Bradley | 528/400 X |
| 4,226,755 | 10/1980 | Knecht | 528/296 X |
| 4,284,754 | 8/1981 | Chattha et al. | 528/108 X |
| 4,289,812 | 9/1981 | Martin | 528/108 X |
| 4,360,613 | 11/1982 | Shimp | 528/108 X |
| 4,397,970 | 8/1983 | Campbell et al. | 528/108 X |
| 4,452,929 | 6/1984 | Powers et al. | 528/108 X |
| 4,487,859 | 12/1984 | Martino | 526/277 X |
| 4,613,661 | 9/1986 | Langer et al. | 528/108 |

*Primary Examiner*—Earl Nielsen
*Attorney, Agent, or Firm*—Stephen V. O'Brien

[57] ABSTRACT

The present invention relates to hardenable mixtures containing:

(i) a polyglycidyl ether or ester based on an aliphatic, cycloaliphatic or aromatic alcohol or a corresponding carboxylic acid and (ii) a hardener obtainable by reaction of:

(A) a mixture of 2–4 mol of a monohydric, aliphatic alcohol and 1 mol of phosphorus pentoxide in an inert organic solvent, or of 2 mol of a dialkyl phosphate or of 2 mol of phosphoric acid, if appropriate in combination with 1–2 mol of a monohydric, aliphatic alcohol, with (B) 0.5–1.5 mol of a diglycidyl ether based on a cycloaliphatic or aromatic diol, with the proviso that the said diglycidyl ether used for the preparation of the hardener has an average molecular weight (number-average) of not more than 2,500 and the said hardener is essentially free from 1,2-epoxide groups.

The hardenably mixtures are suitable in particular for the production of coatings.

11 Claims, No Drawings

SELECTED PHOSPHORIC ACID ESTERS AS HARDENERS FOR EPOXY RESINS

The present invention relates to hardenable epoxy mixtures containing certain phosphoric acid esters as hardeners, selected phosphoric acid esters, the hardened products and the use of the hardenable mixtures for the production of coatings.

Hardenable mixtures of diglycidyl ethers of bisphenol A and phosphoric acid as a hardener are known from German Pat. No. 875,725. The mixtures are suitable for the production of coatings and are distinguished by a high adhesive strength, in particular on ferrous metals. They furthermore have a good resistance to chemicals and a good flexibility.

Water-soluble or water-dispersible compounds which can be obtained by reaction of epoxy resins, in particular diglycidyl ethers based on bisphenol, with phosphoric acid or condensed phosphoric acids, such as pyrophosphoric acid, followed by subsequent neutralization are known from U.S. Pat. No. 4,289,812.

The water-soluble resins can be crosslinked via the P-OH groups. The hardeners used are, for example, ureas and melamine or phenolic resins. The preferred field of use of these formulations is the production of coatings.

U.S. Pat. No. 4,397,970 describes a further development of the subject matter described above. This is a process for the preparation of water-soluble or water-dispersible compounds, as described above, in which phosphorus pentoxide is used as the source of phosphorus.

However, none of these patent specifications shows that adducts of phosphoric acid (derivatives) on epoxy resins can be used as epoxy hardeners.

By using adducts, the mixing ratio between the epoxy resin and the hardener can as a rule be adjusted to a more favourable value, i.e. closer to 1:1. Metering and mixing of the two compounds thereby become simpler. Various properties of the hardenable mixture, such as the viscosity or solids content, or of the hardened product, such as its flexibility, can also be varied by purposeful selection of the components during the preparation of the hardener.

A selected class of adducts of phosphoric acid (derivatives) on certain epoxy resins has now been found, which are suitable as hardeners for epoxy resins. Coatings with excellent properties can be produced by hardening epoxy resins containing these hardeners.

The present invention relates to a hardenable mixture containing:
(i) a polyglycidyl ether or ester based on an aliphatic, cycloaliphatic or aromatic alcohol or a corresponding carboxylic acid and
(ii) a hardener obtainable by reaction of:
   (A) a mixture of 2–4 mol of a monohydric, aliphatic alcohol and 1 mol of phosphorus pentoxide in an inert organic solvent, or of 2 mol of a dialkyl phosphate or of 2 mol of phosphoric acid, if appropriate in combination with 1–2 mol of a monohydric, aliphatic alcohol, with
   (B) 0.5–1.5 mol of a diglycidyl ether based on a cycloaliphatic or aromatic diol,
with the proviso that the said diglycidyl ether used for the preparation of the hardener has an average molecular weight (number-average) of not more than 2,500 and the said hardener is essentially free from 1,2-epoxide groups.

Component i) is preferably a polyglycidyl ether, particularly preferably a digilycidyl ether. Examples of compounds of this type are polyglycidyl or poly-($\beta$-methylglycidyl) ethers obtainable by reaction of a compound having at least two free alcoholic hydroxyl groups and/or phenolic hydroxyl groups and a suitably substituted epichlorohydrin under alkaline conditions, or in the presence of an acid catalyst with subsequent treatment with an alkali.

Ethers of this type are derived, for example, from acyclic alcohols, such as ethylene glycol, diethylene glycol and higher poly-(oxyethylene) glycols, propane-1,2-diol or poly-(oxypropylene) glycols, propane-1,3-diol, butane-1,4-diol, poly-(oxytetramethylene) glycols, pentane-1,5-diol, hexane-1,6-diol, hexane-2,4,6-triol, glyercol, 1,1,1-trimethylolpropane, pentaerythritol, or sorbitol, and polyepichlorohydrins.

However, they can also be derived, for example, from cycloaliphatic alcohols, such as 1,3- or 1,4-dihydroxycyclohexane, bis-(4-hydroxycyclohexyl)-methane, 2,2-bis-(4-hydroxycyclohexyl)-propane or 1,1-bis-(hydroxymethyl)-cyclohex-3-ene, or they have aromatic nuclei, such as N,N-bis-(2-hydroxyethyl)-aniline or p,p'-bis-(2-hydroxyethylamino)-diphenylmethane.

The polyglycidyl ethers in component i) can also be derived from mononuclear phenols, for example from resorcinol or hydroquinone; of they are based on polynuclear phenols, for example on bis-(4-hydroxyphenyl)-methane, 4,4'-dihydroxydiphenyl, bis-(4-hydroxy-phenyl) sulfone, 1,1,2,2-tetrakis-(4-hydroxyphenyl)-ethane, 2,2-bis-(4-hydroxyphenyl)-propane or 2,2-bis-(3,5-dibromo-hydroxyphenyl)-propane, and on novolaks obtainable by condensation of aldehydes, for example formaldehyde, acetaldehyde, chloral or furfuraldehyde, with phenols, such as phenol, or with phenols which are substituted in the nucleus by chlorine atoms or $C_1C_9$alkyl groups, for example 4-chlorophenol, 2-methylphenol or 4-tert-butylphenol, or obtainable by condensation with bisphenols as described above.

Component (i) can also be a polyglycidyl ester. Examples of compounds of this type are polyglycidyl and poly-($\beta$-methylglycidyl) esters obtainable by reaction of a compound having at least two carboxyl groups in the molecule and epichlorohydrin or glycerol dichlorohydrin or $\beta$-methyl epichlorohydrin. The reaction is advantageously carried out in the presence of bases.

Aliphatic polycarboxylic acids can be used as the compound having at least two carboxyl groups in the molecule. Examples of these polycarboxylic acids are oxalic acid, succinic acid, glutaric acid, adipic acid, pimelic acid, suberic acid, azelaic acid, sebacic acid or dimerized or trimerized linoleic acid.

However, it is also possible to use cycloaliphatic polycarboxylic acids, for example tetrahydrophthalic acid, 4-methyltetra-hydrophthalic acid, hexahydrophthalic acid or 4-methylhexahydrophthalic acid.

Aromatic polycarboxylic acids can furthermore be used, for example phthalic acid, isophthalic acid or terephthalic acid.

Mixtures of the epoxide compounds defined above can of course also be used as component (i).

To prepare component (ii), a suitable source of phosphorus is reacted with certain diglycidyl ethers. The amounts and reaction conditions are chosen here so that the 1,2-epoxide groups of the diglycidyl ether are essentially consumed by the reaction.

The diglycidyl ether component should not exceed an average molecular weight of 2,500, since otherwise side reactions which as a rule lead to marked crosslinking of the diglycidyl ether component and to a product which is unsuitable for the hardening reaction must be reckoned with.

The reaction to give the hardener should be carried out in particular between the 1,2-epoxide groups and the free OH groups of the phosphoric acid or phosphoric acid derivatives. The reaction between the free OH groups of the phosphorus component and other reactive groups in the diglycidyl ether component, for example secondary alcohol groups, can as a rule be controlled by the choice of the amounts of the reaction components. No unambiguous structural formula can be given for the reaction product, since, in addition to masking of the terminal epoxide groups, side reactions on other reactive groups of diglycidyl ether component may probably also proceed to a small extent. Partial cyclization of the phosphoric acid ester groups with adjacent secondary OH groups can furthermore proceed. Some of the alkyl groups of a phosphoric acid ester used can also be hydrolysed.

In general, 0.5–1.5, preferably 0.5–1.0, free 1,2-epoxide groups of the diglycidyl ether component should be taken per free OH group of the phosphoric acid component.

Examples of phosphorus components which are chosen are:

(A1) a mixture of 2–4 mol, preferably 2–3 mol, of a monhydric aliphatic alcohol and 1 mol of phosphorus pentoxide in an inert organic solvent. The alcohol is preferably taken in the solvent and the phosphorus pentoxide is added in portions so that the heat of reaction liberated is removed.

Suitable alcohols for component A are monohydric primary, secondary, and tertiary aliphatic alcohols, in particular the primary alcohols, and of these in particular the $C_1$–$C_8$ alcohols.

Alcohols which are particularly preferably suitable for methanol, ethanol, n-propanol, n-butanol and n-hexane, but especially n-butanol.

Suitable organic solvents are those compounds which are inert under the reaction conditions and which are capable of dissolving at least the alcohol and the reaction product with phosphorus pentoxide.

Examples of these are aromatic hydrocarbons, such as toluene, xylene or ethylbenzene, and aliphatic ketones, such as acetone or methyl ethyl ketone, or esters, such as butyl acetate or methoxypropyl acetate.

Dialkyl phosphates can furthermore be chosen as phosphorus components (A2). These are a rule esters with $C_1$–$C_8$ aliphatic, primary alcohols, in particular the dimethyl ester, diethyl ester, di-n-propyl ester, and very particularly preferably, the di-n-butyl ester.

The ester is used as such or is taken in an inert organic solvent.

This can be one of the abovementioned solvents. As a rule, the amount of dialkyl ester is chosen so that 0.5–1.5, preferably 0.5–1.0, free 1,2-epoxide groups of the diglycidyl ether component are present per free OH group of the ester.

Phosphoric acid can also be used as the phosphorus component (A3). This can either be used as such or can be taken as a solution in an inert organic solvent, as defined above.

Here also, 0.50–1.5, preferably 0.5–1.0, free 1,2-epoxide groups are advantageously used for the first free OH group of the phosphoric acid. The remaining 2 free OH groups of the phosphoric acid are less reactive under the reaction conditions and are available for the hardening reaction.

The phosphoric acid can also be taken in combination with an aliphatic alcohol, preferably with n-butanol. The amount of alcohol is advantageously chosen so that 1–2 mol of alcohol are present per mol of phosphoric acid.

The diglycidyl ethers of a cycloaliphatic or aromatic diol for the preparation of component (ii) are preferably the cycloaliphatic or aromatic diglycidyl ethers listed above for component (i), as long as their average molecular weight does not exceed 2,500, preferably 1,800.

Diglycidyl ethers based on bisphenol A with an average molecular weight of between 350 and 1,800, in particular between 350 and 1,500, are preferably chosen.

The reaction between the phosphoric acid component and the diglycidyl ether is advantageously carried out at elevated temperature. For this, the epoxide component is as a rule added dropwise to the dissolved phopshorus compound and the reaction is allowed to proceed until the epoxide groups have been consumed completely.

Solid epoxide components are advantageously first dissolved in an inert organic solvent, for example in one of the compounds listed above.

The reaction temperture is, as a rule, 60°–150° C., preferably 100°–120° C.

The reaction can be carried out under an inert gas, for example under nitrogen.

The reaction product as a rule has an average molecular weight of the order of magnitude of the diglycidyl ether used; this is as a rule not more than 2,800 (number-average). Preferred products have average molecular weights (number-average) of 500 to 1,800, in particular 500 to 1,500.

The acid number of the hardener component (ii) is astonishingly low and as a rule lies between 20 and 200 mg of KOH/g, preferably between 30 and 150 mg of KOH/g. Surprisingly, the reactivity of these hardeners is quite high, so that the reaction can also be carried out without customary reaction accelerators. The rate of the hardening reaction can of course be increased further by the addition of accelerators.

The invention also relates to the use of compounds (ii) as defined above as hardeners for epoxy resins.

Components (ii) in which the diglycidyl ether for the preparation of the hardener is a diglycidyl ether based on bisphenol A or bisphenol F, preferably on bisphenol A, or a diglycidyl ether based on hydrogenated bisphenol A or hydrogenated bisphenol F, preferably based on hydrogenated bisphenol A, are preferred.

Hardenable mixtures as defined above wherein the diglycidyl ether for the preparation of component (ii) is a diglycidyl ether based on bisphenol A with an average molecular weight (number-average) of 350–1800 or a diglycidyl ether based on a hydrogenated bisphenol A are very particularly preferred.

Hardenable mixtures which are also preferred contain (i) a diglycidyl ether based on bisphenol A or bisphenol F, particularly preferably a diglycidyl ether based on bisphenol A and very particularly preferably a glycidyl ether based on bisphenol A with a molecular weight of more than 1500, and (ii) a hardener, as defined above, obtainable by reaction with a diglycidyl ether based on bisphenol A.

The hardened products of mixtures of this type are distinguished by a particularly good resistance to chemicals and give coatings having a good flexibility. They can be used, in particular, in the coating sector and are particularly suitable for coating foodstuffs containers. The invention also relates to the use of these mixtures for this purpose.

Further preferred hardenable mixtures contain (i) a polyglycidly ether based on an aliphatic alcohol or a diglycidyl ether based on a hydrogenated bisphenol A or hydrogenated bisphenol F, in particular a diglycidyl ether based on a hydrogenated bisphenol A or the tetraglycidyl ether of bis-trimethylolpropane, and (ii) a hardener as defined above, obtainable by reaction with a diglycidyl ether based on a hydrogenated bisphenol A.

Hardened products of mixtures of this type are distinguished by a particularly good colour stability and resistance to weathering and can therefore particularly preferably be used in the coating sector.

The invention thus also relates to the use of the mixtures according to the invention, and in particular the mixtures of the type last defined, for the production of coatings.

The compounds obtainable by reaction of combinations of aliphatic alcohol, phosphorus pentoxide and diglycidyl ether or of dialkyl phosphate and diglycidyl ether, as defined above, are novel and are likewise the subject matter of the present invention.

Other customary additives and/or hardening accelerators can also be added to the hardenable mixtures according to the invention.

Examples of other customary additives are extenders, fillers and reinforcing agents, for example mineral silicates, mica, bentonites, kaolin or silicic acid aerogel, and furthermore pigments and dyes, such as carbon black, oxide colours or titanium dioxide, suitable plasticizers, such as phthalates, in particular dibutyl phthalate, adipates, sebacates or citrates, thixotropic agents of flow control agents, such as silicones, waxes or stearates.

Such additives can be added to the hardenable mixtures in any phase before hardening.

Examples of hardening accelerators are: tertiary amines, salts thereof or quaternary ammonium compounds, for example benzyldimethylamine, 2,4,6-tris-(dimethylaminomethyl)-phenyl, 1-methylimidazole, 2-ethyl-4-methylimidazole, 4-aminopyridine, tripentylammonium phenate or tetramethylammonium chloride; or Sn compounds, for example dibutyltin dilaurate or tin octoate.

The hardenable mixtures according to the invention can be prepared in the customary manner with the aid of known mixing units (stirrers or mills).

The hardenable epoxy resin mixtures according to the invention are used in particular in the fields of surface protection and adhesives. They can be used as lacquers, adhesives and trowelling compositions in the non-filled or filled state, in a formulation adapted in each case to the specific intended use.

A particularly preferred field to use is surface protection.

The mixtures according to the invention are advantageously hardened in the temperature range from 50° C. to 300° C., preferably from 200° to 250° C.

The term "harden" as used here means conversion of the soluble, either liquid or fusible, hardenable mixtures into solid, insoluble and non-fusible, three-dimensionally crosslinked products in the form of coatings, lacquer films and glueings. The invention also relates to the products hardened by heating the mixtures defined above containing components (i) and (ii).

The following examples illustrate the invention.

EXAMPLES

The following epoxy resins are used in the examples:

Resin I: Diglycidyl ethers based on hydrogenated bisphenol A; epoxide content: 4.4–4.8 equivalents/kg; viscosity: 2,000–3,000 mPas at 25° C., measured with a Hoeppler viscometer; molecular weight (number-average): 424.

Resin II: Technical grade diglycidyl ether based on bisphenol A; epoxide content: 5.2–5.4 equivalents/kg; viscosity: 12,000–16,000 mPas at 25° C., measured with a Hoeppler viscometer; molecular weight (number-average): 375.

Resin III: Solid diglycidyl ether based on bisphenol A; epoxide content: 1.9–2.0 equivalents/kg; viscosity: 200–250 mPas at 25° C., measured as a 40% strength solution in n-butylcarbitol; molecular wieght (number-average): 1,000.

Resin IV: Solid diglycidyl ether based on bisphenol A; epoxide content: 1.12–1.20 equivalents/kg; viscosity: 550–700 mPas at 25° C., measured as a 40% strength solution in n-butylcarbitol; molecular weight (number-average): 1,710.

Resin V: Polyglycidyl ester of pentaerythritol; epoxide content: 6.0–6.5 equivalents/kg; viscosity: 200–500 mPas at 25° C., measured with a Hoeppler viscometer.

General operating instruction for the preparation of the epoxy hardeners from phosphorus pentoxide Butanol and butyl acetate are taken at room temperature. $P_2O_5$ is then slowly added in portions and dissolved, with stirring. The solution is heated up to about 70° C. and the corresponding epoxy resin is then added via a dropping funnel. Solid resins (fro example resin IV) are first dissolved in butyl acetate (50% strength). The mixture is allowed to react at 100°–120° C. for 30 minutes and is cooled and discharged.

The details of the preparation of the various epoxy hardeners are to be found in Table 1.

TABLE 1

| Preparation of phosphoric acid esters as hardeners for epoxy resins (starting from $P_2O_5$) | | | | | | | | |
|---|---|---|---|---|---|---|---|---|
| Hardener No. | 1 | 2 | 3 | 4 | 5 | 6 | 7 | 8 |
| Phosphorus pentoxide (mol) | 1 | 1 | 1 | 1 | 1 | 1 | 1 | 1 |
| Butanol (mol) | 2 | 3 | 2 | 3 | 2 | 3 | 2 | 3 |
| Butyl acetate (g) | 418 | 344 | 369 | 295 | 994 | 920 | 1704 | 1630 |
| Resin I (mol) | 1 | 1 | | | | | | |
| Resin II (mol) | | | 1 | 1 | | | | |
| Resin III (mol) | | | | | 1 | 1 | | |
| Resin IV (mol) | | | | | | | 1 | 1 |
| Acid number, mg of KOH/g | 73 | 77 | 71 | 80 | 41 | 43 | 29 | 29 |
| Viscosity at 25° C. (mPas)[1] | 600 | 300 | 1200 | 650 | 2250 | 1500 | 2700 | 2300 |
| Solids | 63 | 70 | 64 | 71 | 56 | 60 | 54 | 56 |

TABLE 1-continued

Preparation of phosphoric acid esters as hardeners for epoxy resins (starting from $P_2O_5$)

| Hardener No. | 1 | 2 | 3 | 4 | 5 | 6 | 7 | 8 |
|---|---|---|---|---|---|---|---|---|
| content (%) | | | | | | | | |

[1] measured with a Hoeppler viscometer

General operating instructions for the preparation of the epoxy hardeners from phosphoric acid or phosphoric acid esters The phosphorus compound in question is taken as a 50% solution in in butanol, butyl acetate or methyl ethyl ketone, and the epoxy resin in question is added dropwise at 70° C.. The mixture is allowed to react at 100°–120° C. for 30 minutes and is cooled and discharged.

The details of the preparation of the various epoxy hardeners are to be found in Table 2.

TABLE 2

Preparation of phosphoric acid esters as hardeners for epoxy resins (starting from phosphoric acid or phosphoric acid esters)

| Hardener No. | 9 | 10 | 11 | 12 |
|---|---|---|---|---|
| Phosphoric acid (derivatives) | $H_3PO_4$ | $H_3PO_4$ | $H_3PO_4$ | $(C_4H_9O)_2P(O)(OH)$ |
| (mol)[2] | (2) | (2) | (2) | (2) |
| Solvent | Butanol | MEK[3] | MEK[3] | Butyl acetate |
| Epoxy resin | II | II | IV | II |
| (mol) | (1) | (1) | (1) | (1) |
| Acid number, mg of KOH/g | 138 | 149 | 45 | 75 |
| Viscosity at 25° C. (mPas)[1] | 310 | 210 | 760 | 300 |

[1] measured with a Hoeppler viscometer
[2] per mol of epoxy resin (= 2 mol of epoxide groups)
[3] methyl ethyl ketone Preparation of hardenable epoxy mixtures containing phosphoric acid esters as the hardener Varnish coatings of epoxy formulations according to Tables 3 and 4 are produced and these are hardened at 180° C. for 20 minutes. Steel sheets are in each case used as the substrates.

The hardened samples are subjected to the following tests:

Pendulum hardness according to Persoz: in accordance with French Standard AFNOR NFT 30 016. The measurement is carried out with an apparatus of the Erichsen 300 type.

Erichsen test: in accordance with DIN 53156.

Impact test: A bolt weighing 1 kg (diameter of the impinging hemisphere: 2 cm) is allowed to fall onto the lacquer side of a coated sheet (film thickness: 40–50 μm) at 20° C. and 65% relative atmospheric humidity, a dent being formed. The impact energy (drop height of the bolt) at which the lacquer coating is still just intact is determined.

Reverse impact test: This test essentially corresponds to the impact test; in this case, however, the bolt is allowed to fall onto the reverse side of the test sheet.

Mandrel bending test: A coated sheet is bent from the reverse side to the lacquer over a mandrel of 8 mm diameter at room temperature. The bending angle up to which the lacquer coating still remains intact is determined. An angle of 180° corresponds to complete bending of the test sheet.

Cross-hatch test: in accordance with DIN 53 151 with incision apparatus A.

Acetone rubbing test: A lacquer surface is wiped in each case 10 times in both directions with a swab soaked in acetone. The quality of the surface is then evaluated visually and rated in accordance with a scale of 0–5. 0 denotes a coating which has not been attacked; 5 denotes complete dissolving away of the coating.

TABLE 3

Production and investigation of hardened epoxy formulations containing phosphoric acid esters as hardeners

| Example No. | I | II | III | IV | V | VI | VII | VIII | IX |
|---|---|---|---|---|---|---|---|---|---|
| Resin V (g) | 100 | 100 | | | | | | | |
| Resin I (g) | | | 100 | | | | | | |
| Resin IV[(1)] (g) | | | | 100 | 100 | 100 | 100 | 100 | 100 |
| Hardener No. | 1 | 2 | 1 | 3 | 4 | 5 | 6 | 7 | 8 |
| (g) | (550) | (520) | (350) | (54) | (48) | (92) | (87) | (130) | (130) |
| Hardness according to Persoz (S) | 70 | 100 | 180 | 390 | 390 | 390 | 390 | 390 | 380 |
| Erichsen test (mm) | 10 | 9 | 9 | 8 | 9 | 9 | 9 | 9 | 9 |
| Impact test (cm) | 90 | 90 | 90 | 90 | 90 | 90 | 90 | 90 | 90 |
| Reverse impact test (cm) | 90 | 90 | 20 | 90 | 90 | 90 | 90 | 90 | 90 |
| Mandrel bending test (4) | 180 | 180 | 180 | 180 | 180 | 180 | 180 | 180 | 180 |
| Cross-hatch test 1 mm (Ch) | 0 | 0 | 0 | 4 | 0 | 0 | 0 | 0 | 0 |
| Acetone rubbing test (20x) | 0 | 0 | 2 | 0 | 0 | 1 | 1 | 2 | 2 |

[(1)] The amounts stated relate to a 50% solution in butyl acetate.

TABLE 4

Preparation of hardenable epoxy formulations containing phosphoric acid esters as hardeners

| Example No. | X | XI | XII | XIII |
|---|---|---|---|---|
| Resin IV[(1)] (g) | 100 | 100 | 100 | 100 |
| Hardener No. (g) | 9 (24) | 10 (21) | 11 (72) | 12 (43) |
| Hardness according to Persoz (sec) | 395 | 380 | 395 | 400 |
| Erichsen test (mm) | 8.8 | 9.2 | 9.5 | 8.8 |
| Impact test (cm) | 90 | 90 | 90 | 90 |
| Reverse impact test (cm) | 90 | 90 | 90 | 90 |
| Mandrel bending test (4) | 180 | 180 | 180 | 180 |
| Cross-hatch test 1 mm (Ch) | 0 | 0 | 0 | 0 |
| Acetone rubbing test (20x) | 1 | 1 | 1 | 1 |

[(1)] The amounts stated relate to a 50% solution in butyl acetate.

What is claimed is:

1. A curable mixture containing:

(i) a polyglycidyl ether of an aliphatic, cycloaliphatic or aromatic alcohol or a polyglycidyl ester of a carboxylic acid and (ii) a curing agent obtainable by reaction of;
- (A) a mixture of 2-4 mol of a monohydric, aliphatic alcohol and 1 mol of phosphorus pentoxide in an inert organic solvent, or of 2 mol of a dialkyl phosphate or of 2 mol of phosphoric acid, if appropriate in combination with 1-2 mol of a monohydric, aliphatic alcohol, with
- (B) 0.5-1.5 mol of a diglycidyl ether of a cycloaliphatic or aromatic diol, with the proviso that the said diglycidyl ether used for the preparation of the curing agent has an average molecular weight (number-average) of not more than 2,500 and the said curing agent is essentially free from 1,2-epoxide groups.

2. A curable mixture according to claim 1, in which the monohydric, aliphatic alcohol is n-butanol.

3. A curable mixture according to claim 1, in which the diglycidyl ether for the preparation of the curing agent (ii) is a diglycidyl ether of bisphenol A or bisphenol F.

4. A curable mixture according to claim 1, in which the diglycidyl ether for the preparation of the curing agent (ii) is a diglycidyl ether of hydrogenated bisphenol A or bisphenol F.

5. A curable mixture according to claim 1, in which the diglycidyl ether for the preparation of component (ii) is a diglycidyl ether of bisphenol A with an average molecular weight (number-average) of 350-1800 or a diglycidyl ether of a hydrogenated bisphenol A.

6. A curable mixture according to claim 1, containing (i) a diglycidyl ether of bisphenol A or bisphenol F and (ii) a curing agent obtainable by reaction with a diglycidyl ether of bisphenol A.

7. A curable mixture according to claim 1, containing (i) a polyglycidyl ether of an aliphatic alcohol or a diglycidyl ether of a hydrogenated bisphenol A or hydrogenated bisphenol F and (ii) a curing agent obtainable by reaction with a diglycidyl ether of a hydrogenated bisphenol A.

8. A compound obtainable by reaction of:
- (A) a mixture of 2-4 mol of monohydric, aliphatic alcohol and 1 mol of phosphorus pentoxide in an inert organic solvent or of 2 mol of a dialkyl phosphate with
- (B) 0.5-1.5 mol of a diglycidyl ether of a cycloaliphatic or aromatic diol, with the proviso that the said diglycidyl ether has an average molecular weight (number-average) of not more than 2,500 and that the said compound is essentially free from 1,2-epoxide groups.

9. A cured product obtainable by heating the curable mixture according to claim 1.

10. A process for the production of coatings, which comprises applying a curable mixture according to claim 1 to a substrate.

11. A process for coating foodstuffs containers, which comprises applying a curable mixture according to claim 6.

* * * * *